(12) United States Patent
Doss et al.

(10) Patent No.: US 7,617,308 B2
(45) Date of Patent: Nov. 10, 2009

(54) CONTEXT CONFLICT RESOLUTION AND AUTOMATIC CONTEXT SOURCE MAINTENANCE

(75) Inventors: J. Smith Doss, Raleigh, NC (US); Renee M. Kovales, Cary, NC (US); Diane P. Pozefsky, Chapel Hill, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/183,356

(22) Filed: Jul. 31, 2008

(65) Prior Publication Data

US 2008/0288435 A1    Nov. 20, 2008

Related U.S. Application Data

(63) Continuation of application No. 10/245,174, filed on Sep. 17, 2002, now Pat. No. 7,487,234.

(51) Int. Cl.
    *G06F 13/00* (2006.01)
(52) U.S. Cl. .................. 709/223; 709/217; 709/227; 707/10; 370/412
(58) Field of Classification Search .............. 709/223, 709/217, 228; 707/10; 713/201
    See application file for complete search history.

(56) References Cited

U.S. PATENT DOCUMENTS

| 6,536,037 | B1 * | 3/2003 | Guheen et al. | 717/151 |
| 6,721,713 | B1 * | 4/2004 | Guheen et al. | 705/1 |
| 7,315,826 | B1 * | 1/2008 | Guheen et al. | 705/7 |
| 7,487,234 | B2 * | 2/2009 | Doss et al. | 709/223 |

* cited by examiner

*Primary Examiner*—Khanh Q Dinh
(74) *Attorney, Agent, or Firm*—Marcia L. Doubet

(57) ABSTRACT

Techniques are disclosed for detecting and resolving conflicts in context information from various sources. That information may be used to automatically update one or more context sources and/or to validate or invalidate (until further notice or for a period of time) input from one or more context sources. Or, the updates can be made in response to the user's instructions. Rules are used in preferred embodiments to dictate the conflict resolution approach for individual users. Updating the context source is particularly useful when the source is an electronic calendar. Updates that may be made to the calendar include adding, deleting, or changing scheduled events and/or working hours. Invalidating data from a context source is particularly useful for lost, forgotten, misplaced, or loaned devices. Marking data from a context source as valid is preferably done when harmony among several context sources is detected. Context suppliers may be notified of errors or discrepancies in their context data.

16 Claims, 7 Drawing Sheets

CONTEXT CONFLICT RESOLUTION AND AUTOMATIC CONTEXT SOURCE MAINTENANCE

RELATED INVENTIONS

The present invention is related to the following commonly-assigned U.S. Patents: U.S. Pat. No. 6,988,128, titled "Calendar Events and Calendar-Driven Application Technique" (Ser. No. 09/670,844); U.S. Pat. No. 6,640,230, titled "Calendar-Driven Application Technique for Preparing Responses to Incoming Events" (Ser. No. 09/671,001); U.S. Pat. No. 6,640,230, titled "Calendar-Enhanced Awareness for Instant Messaging Systems and Electronic Status Boards" (Ser. No. 09/941,045); U.S. Pat. No. 7,035,865 (Ser. No. 10/245,156, filed concurrently herewith), titled "Keeping Working Hours and Calendar Entries Up-to-Date"; and U.S. Pat. No. 7,318,040 (Ser. No. 10/245,200, filed concurrently herewith), titled "Predicting and Adjusting Users' Working Hours and Electronic Calendar Events". The disclosures of these related inventions are hereby incorporated herein by reference.

BACKGROUND OF THE INVENTION

1. Field of the Invention

The present invention relates to computer systems, and deals more particularly with methods, systems, and computer program products for resolving context conflicts (for example, a person's electronic calendar shows that he has a meeting scheduled in a particular location, but a badge reader or tracking device indicates that he is elsewhere), and programmatically updating the context source, invalidating the source (at least temporarily), or notifying the supplier of context information.

2. Description of the Related Art

The term "context service", as used herein, refers to an automated service that provides information about user context. Context services are known in the art. Examples of context services include a system referred to as "Owl" in "Issues for Context Services for Pervasive Computing", M. R. Ebling et al., in Proceedings of the Workshop on Middleware for Mobile Computing 2001, Heidelberg, Germany (November 2001), and the Context Toolkit from Georgia Institute of Technology. Refer to http:/www.cs.arizona.edu/mmc/Program.html and http://www.cc.gatech.edu/fce/contexttoolkit for more information on these context services.

A context service may receive context information from a variety of sources, including electronic calendars, location sensors, and other sensors such as badge readers and motion detectors. The context service then provides the context information to one or more applications, allowing those applications to be "context aware". Examples of context-aware applications include the following: (1) a notification system that sends notifications to a pager or other device; (2) a location-based service that provides location-specific information (such as traffic data) to a user, depending on the user's context; and (3) a travel-time calculator that uses a person's current location to determine when the person will arrive at another location.

FIG. 1 shows a high-level view of a context service of the prior art. The source of the context information is represented at the left with examples such as an electronic calendar system 100, a cellular phone 110, and a badge reader 120.

The electronic calendar system 100 may be a product such as Lotus Notes®, Microsoft Outlook® 2000, or Microsoft Exchange, or it may be an advanced calendar system such as that disclosed in the related patents. ("Lotus Notes" is a registered trademark of Lotus Development Corporation and "Outlook" is a registered trademark of Microsoft Corporation.) A calendar system provides context information such as a calendar owner's scheduled events, and optimally the location of meetings and other events, preferred means of contact during certain events, and so forth.

A cell phone 110 may be used to provide context information about its user such as the user's physical location, and the cell phone may also provide device information such as its telephone number or serial number.

A badge reader 120 can be used to provide information about the identification of people who have passed their badge through the reader, as well as the time and location at which this occurred. "Smart badges", on the other hand, function as transmitters that provide continuous location information without requiring explicit action at a badge reader.

Other sources of context information 130 might include a motion detector in an office building. For example, an organization might place motion detectors in offices or conference rooms in order to automatically turn off the lights when no movement has been detected for a configurable time interval. Executing application programs may be capable of determining a level of awareness about their users (e.g., whether the user is logged in, logged off, inactive, and so forth) and may be another source of context information.

Each context source typically has a context receiver, shown generally at 140 of FIG. 1. A context receiver receives, analyzes, and interprets input from the context source, and then makes this information available to applications via the application programming interface ("API") 150. An example of context interpretation is the translation of geographical coordinates into a street address or a building and office number. An example of analysis is the reduction of frequently-transmitted location data into more meaningful events. That is, most applications don't need or want to know if a person moves within his office or a meeting room, but would like to be informed if the person moves to another room or leaves the building.

The granularity of context information provided to an application 160, 170 may be determined in a variety of ways, according to the prior art. For example, a configurable number of events might be sampled during a configurable time interval. Values of these configurable parameters may vary depending on factors such as a user's location. Thus, an application might receive less granular movement information for a person who is driving down the highway and more granular information for that same person if he is moving within a building.

Context sources can be categorized into two basic types, updateable and fixed, as shown at 200 and 210 in FIG. 2. The updateable context sources are sources such as electronic calendars, where the context can be changed at the source to update or correct the context information. (That is, if a user's calendar data provides incorrect context information about the user, then the calendar can be modified.) Fixed context sources are devices such as cell phones with embedded global positioning system ("GPS") receivers that are not designed to be adjusted at the source. As shown in FIG. 2, a plurality of context sources (represented by the basic types 200 and 210) may be used in a context-aware system, each typically sending its context information to a context receiver, shown generally at 220.

This context information is gathered for and provided to context-aware applications 160, 170. The applications can use the context directly or may use the services of a mediator (shown in FIG. 2 at 230), which can receive multiple sources of context information and provide consolidated and more accurate context information to the applications. For example, the same or related context information may be sensed by multiple redundant sensors. By comparing the different sources, the mediator can provide more precise context information to the applications. For example, if there are three redundant sensors, a voting procedure might be used to select one of them. Or, algorithmic comparisons might be used to reject the source with the largest variation among them.

Electronic calendars often contain a wealth of information about their owners. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth.

Electronic calendars may be accessed by people and/or by applications. Calendar data can be used to automate tasks and to inform others about things such as whether the calendar owner is currently available, or is out of the office on business, and so forth. For example, the related invention titled "Calendar Events and Calendar-Driven Application Technique" (U.S. Pat. No. 6,988,128) uses calendar data to automate voice mail greetings, among other things. It does this by analyzing calendar data, including a person's scheduled working hours and other scheduled events. The related invention titled "Calendar-Enhanced Awareness for Instant Messaging Systems and Electronic Status Boards" (U.S. Pat. No. 7,284,002) discloses techniques whereby calendar data is used as input to instant messaging ("IM") systems and electronic status boards. With the increasing use of calendar data, such as disclosed in these related inventions, it becomes more important to keep calendar data up-to-date and accurate.

Occasionally, a person's electronic calendar may not accurately represent his current status. For example, if Lisa is scheduled to be in a meeting from 3 p.m. to 5 p.m. on Friday, but she becomes ill at lunch time and goes home for the rest of the day, her calendar will likely reflect that she should be in her office until 3 p.m., and then in the conference room where the meeting is scheduled for the next two hours. In days past, it was the responsibility of a human administrative assistant or secretary to tend to employees' calendars, taking care of these types of schedule updates. Very few employees have this luxury today, however, and instead are responsible for maintaining their own schedules using electronic calendars. When a calendar user has to manually update her electronic calendar for every variation in her working hours and the meetings and other events which occupy those working hours, it is likely that some updates will not be made. As a result, accesses to the user's calendar data will provide incorrect information about her availability. Accesses may be made by individuals and/or by applications. For example, suppose Ellen is attempting to schedule a last-minute department meeting with all of her co-workers, including Lisa, for Friday afternoon between 2 p.m. and 3 p.m., and accesses their electronic calendars to see whether they will be in the office. Based on Lisa's inaccurate calendar information, Ellen will mistakenly believe that Lisa can attend.

With reference to the related invention titled "Calendar Events and Calendar-Driven Application Technique" (U.S. Pat. No. 6,988,128), if an automated voice mail system according to this related invention takes an incoming call to a calendar user's phone number and generates a message for the caller based on that user's inaccurate calendar data, the caller will be incorrectly informed as to the user's availability. In some cases, this is merely a nuisance. On the other hand, if someone needs to locate the calendar user for an important business matter or for a personal emergency, the incorrect information can have significant consequences.

In general, when an electronic calendar user's actual schedule does not conform to the information that has been provided to the calendar system, individuals looking at the calendar can be misled and applications that rely on calendar data for input cannot function optimally. Similarly, when applications other than electronic calendar systems are using context information that is incorrect, those applications cannot perform optimally. Accordingly, what is needed are improvements that enable context information such as calendar data to more accurately reflect a user's actual status.

SUMMARY OF THE INVENTION

An object of the present invention is to provide improved techniques for keeping context sources such as calendar data accurate by detecting and resolving conflicts in context information.

An additional object of the present invention is to provide techniques for adding, deleting, and/or changing calendar entries to resolve conflicts in a calendar user's status.

Another object of the present invention is to provide techniques for adjusting a user's working hours to resolve conflicts in a calendar user's status.

A further object of the present invention is to provide techniques for invalidating (until further notice or temporarily) a context source to resolve conflicts in a user's status.

Another object of the present invention is to provide techniques for indicating that a context source is valid (until further notice or temporarily) when conflicts involving that context source have been resolved.

Still another object of the present invention is to provide techniques for programmatically notifying a context supplier of conflicts in context information.

Yet another object of the present invention is to make electronic calendars more useful.

A further object of the present invention is to increase the accuracy of information available from context sources, including electronic calendars.

Other objects and advantages of the present invention will be set forth in part in the description and in the drawings that follow and, in part, will be obvious from the description or may be learned by practice of the invention.

To achieve the foregoing objects, and in accordance with the purpose of the invention as broadly described herein, the present invention provides systems, methods, and computer program products for detecting context conflicts and automatically resolving the conflicts. In one aspect, this technique comprises: gathering context information from a plurality of context sources; determining whether a conflict exists in the gathered context information; and if a conflict is determined to exist, resolving the determined conflict by applying a set of rules and performing action(s) specified by one or more of the matching rules. Preferably, the rules are checked by a rules system to ensure that they do not conflict with each other and cause the conflict resolution system to go into a loop. Preferably, gathering of context information is triggered by detecting a context change. This technique may further comprise ignoring, when gathering context information or determining conflicts, any context information marked as invalid.

User interaction may optionally be included when determining how to resolve a detected conflict.

In one scenario, performing the actions may further comprise updating a context source, which may (for example) be a user's electronic calendar. The update to the user's electronic calendar may comprise one or more of adding, deleting, or changing events or working hours on the calendar.

In another scenario, performing the actions may comprise invalidating a context source. The invalidation may be effective until further notice, until an ending time, or for a duration of time. A previously-invalidated context source may be returned to a valid state upon detecting harmony among the context sources.

In yet another scenario, performing the actions may comprise notifying a context supplier of the determined conflict.

The determination of conflicts may, in some cases, determine that a plurality of conflicts exist in the gathered context information, in which case the plurality of conflicts are resolved by applying the set of rules and performing action(s) specified by one or more of the matching rules.

In another aspect, the present invention provides techniques for detecting harmony in context information. Preferred embodiments of this aspect comprise: gathering context information from a plurality of context sources; determining, using the gathered context information, whether harmony exists among multiple ones of the context sources; and if harmony is determined to exist and any of the context sources are marked as invalid, applying a set of rules to determine whether the sources marked as invalid should be marked as providing valid context information.

Techniques of the present invention may also be used advantageously in various methods of doing business. For example, a context conflict resolution system providing the advantageous features disclosed herein may be marketed to users under various revenue models, including monthly subscriptions (or other periodic subscriptions), pay-per-use, etc.

The present invention will now be described with reference to the following drawings, in which like reference numbers denote the same element throughout.

DESCRIPTION OF PREFERRED EMBODIMENTS

Figure 1:
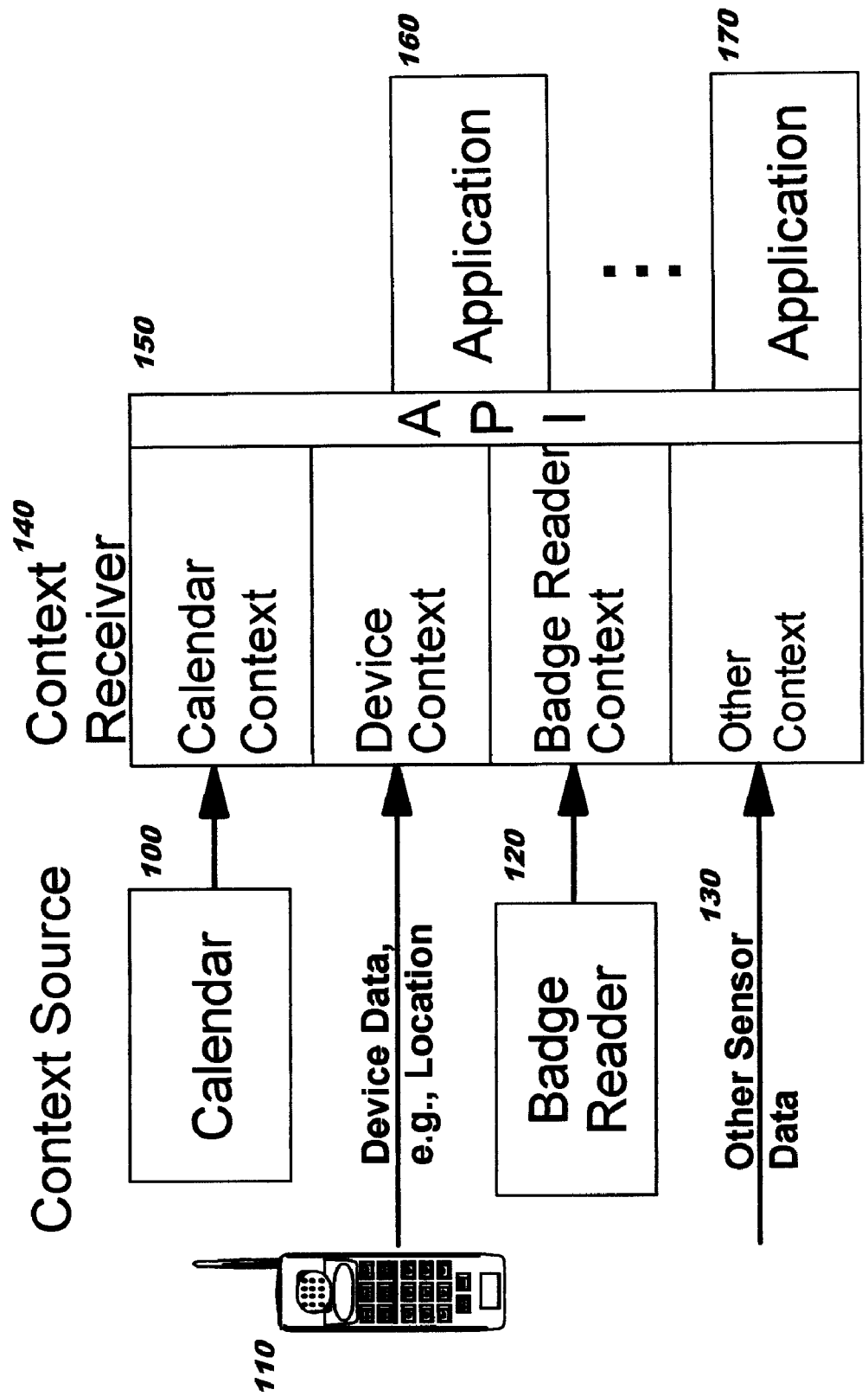
FIG. 1 provides a high-level overview of a context service according to the prior art.

The present invention defines improved techniques for use with context sources such as electronic calendars, whereby calendar data or other context information will more accurately reflect a user's context. Conflicts in the user's context are detected and resolved, and the context source may then be automatically updated. When the context source is a user's calendar, the updates may comprise one or more of adding, deleting, or changing scheduled events and/or working hours. Alternatively, the context source may be invalidated (at least temporarily) to resolve the conflict. As yet another alternative, a notification may be sent to the context supplier, informing the context supplier of the conflict. Combinations of these actions are also possible (such as invalidating a context source and notifying the context supplier). Rules are used in preferred embodiments to specify how the resolution of conflicts should be carried out, as will be described. A set of rules that is applicable to all users or groups of users within an organization may be used; in preferred embodiments, individual users are also allowed to specify rules. The user may be prompted for input before context resolution actions are taken, and may be allowed to confirm or reject impending actions.

Using the techniques disclosed herein, electronic calendar users are able to keep accurate working hours and scheduled events on their calendars much more easily and efficiently, without having to manually detect conflicts in their context and without having to manually resolve such conflicts. Because programmatic means are used, as disclosed herein, it is much more likely that the user's calendar will accurately reflect his working hours and his scheduled events. This improved accuracy will be of benefit to other people viewing the user's calendar as well as to other systems/applications that analyze or use calendar data. Similar advantages may be realized with updateable context sources other than electronic calendars.

The term "calendar data", as used herein, refers to information of the type used by electronic calendars. In preferred embodiments, this information comprises calendar entries (referred to equivalently herein as "calendar events") as well as other information such as user profiles and user preferences. User preferences may be used to indicate how a particular calendar owner's calendar entries should be interpreted, such as the user's preferred mode of contact (e.g., by phone, by pager, etc.) during various types of scheduled events, how often the user checks voice mail, and so forth. User profiles store information such as the calendar owner's working hours, the default time zone to be applied to the user's calendar, and optional profile-specific preferences (such as a pager number with which a user can be contacted during the working hours defined in the particular profile).

It should be noted that while preferred embodiments are described with reference to modifying electronic calendars, this is by way of illustration and not of limitation. The techniques disclosed herein may also be used advantageously to reflect conflict resolutions in other systems.

Figure 2:
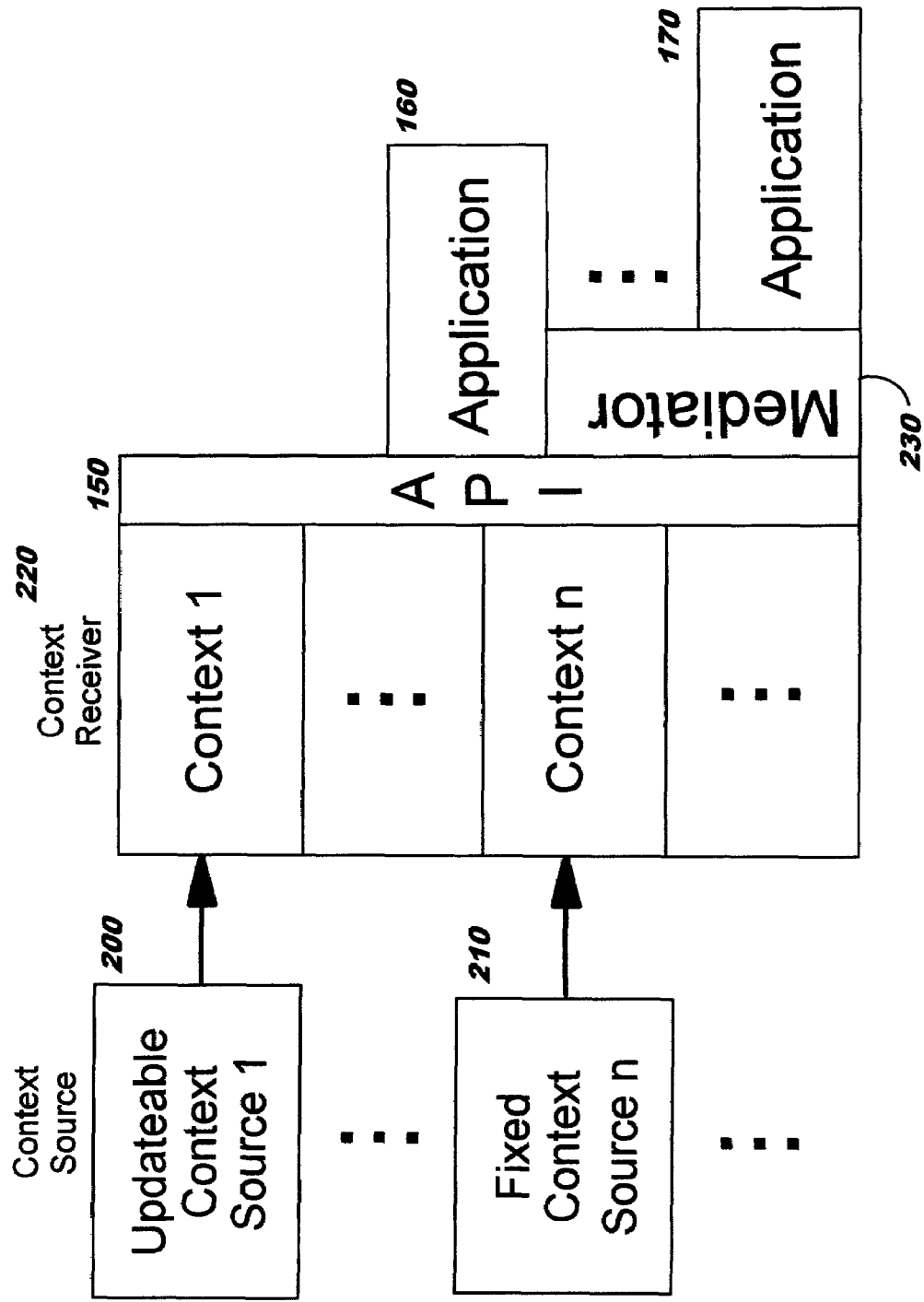
FIG. 2 provides a high-level overview of components of a context service using a mediator to mediate context information from multiple sources, according to the prior art.
Figure 3:
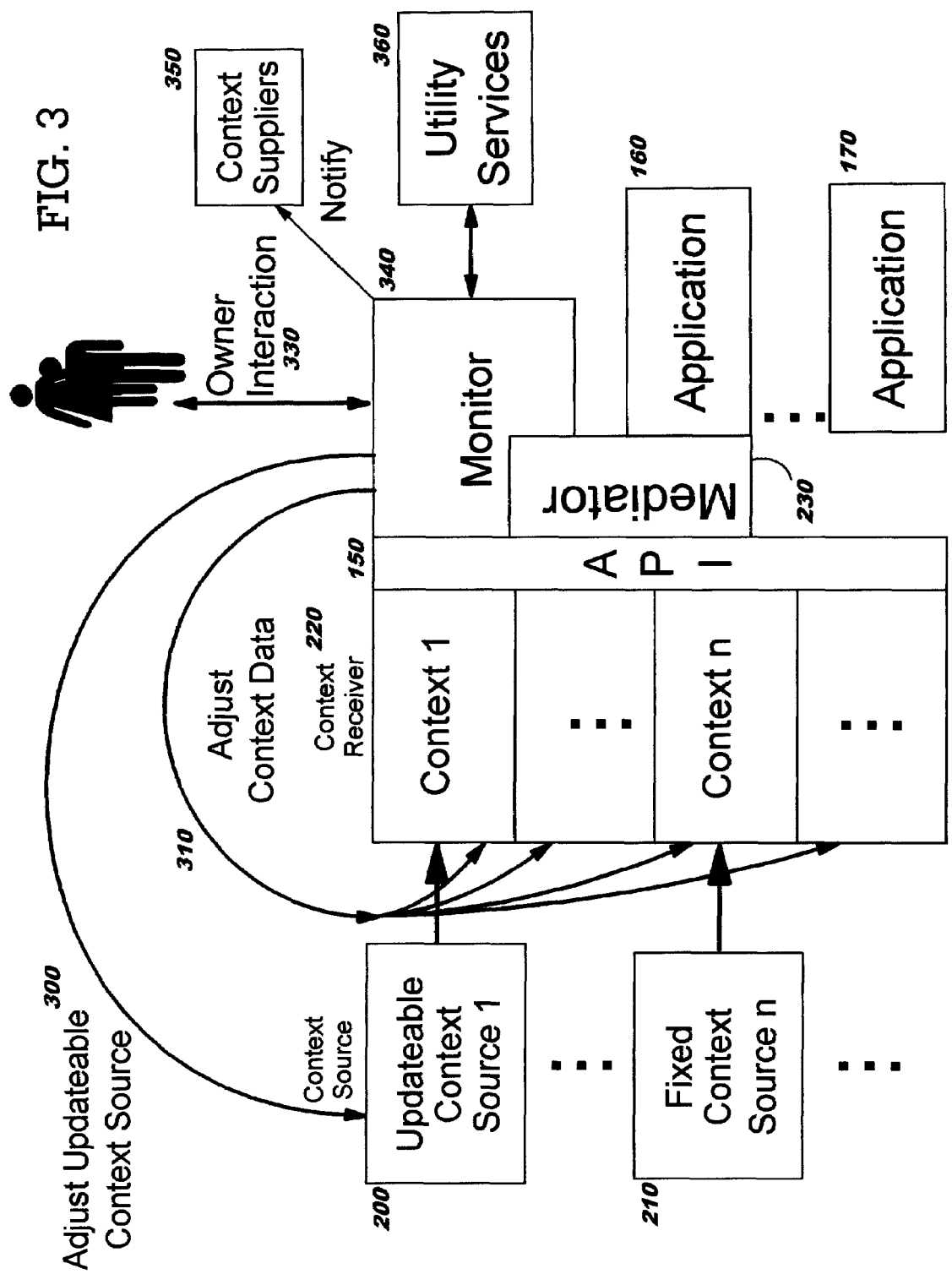
FIG. 3 provides a high-level overview of components that may be used by preferred embodiments of the present invention.

Preferred embodiments of the present invention leverage a context service. Context services of the prior art were described above with reference to FIGS. 1 and 2. FIG. 3 shows a high-level view of components that may be used in an embodiment of the present invention. In addition to providing context data to application programs 160, 170, the context receivers 220 used with preferred embodiments of the present invention also provide context data to a special application called a "monitor" that checks for conflicts. The monitor is shown at 340 of FIG. 3. In preferred embodiments, the context receivers 220 provide meaningful data to this monitor 340. "Meaningful" refers to information that a context receiver has interpreted and consolidated from the input it receives from the context source. Thus, as an example, when a context receiver is processing a user's physical location, it is preferably configured with tolerance parameters that determine when a "meaningful" change in the user's location has occurred. In this manner, the monitor 340 (as well as other context-consuming applications 160, 170) is shielded from being flooded with information that is not useful.

The monitor 340 used with preferred embodiments is augmented as disclosed herein to perform context conflict resolution and automatic context source maintenance, in addition to checking for conflicts. This monitor may operate as part of a context service, or independently from the context service. The monitor preferably uses a set of rules that is customizable by organizations and/or individual users. The monitor may receive input from context receivers via the API 150 directly or via a mediator 230, from users as shown at 330 (e.g., asynchronously or by querying a user for input and receiving the user's reply), and/or from utility services 360.

Context-aware applications rely on accurate context information. An implementation of the present invention may update a context source, as shown in FIG. 3 where an adjustment 300 is made to updateable context source 200. For example, a context conflict on a user's calendar might be resolved by deleting a scheduled event. There may be cases where it is not appropriate to update the context source (such as when the context source is fixed, illustrated by source 210 in FIG. 3). For these cases, the context may be resolved by adjusting the context data, as shown at 310 in FIG. 3. When the monitor determines that a context source is in error, a notification may be sent to the context supplier, as shown at 350.

Along with the actual context information, context services can provide associated information about the validity of the context information they provide. Preferred embodiments of the present invention may make use of this validity information to invalidate a context source for a period of time, letting the interested applications know that the context from this source may be incorrect. For example, when used with a notification system that sends notifications to a pager or other device, setting the pager's context to invalid might result in temporarily holding a page (rather than sending it to the pager) or in sending it to another device whose context is valid. As another example, when a location-based service sends information to a device, the information would not be sent to a device whose context is marked invalid.

Invaliding a context source is preferably done by setting an associated "validity" attribute or field to "invalid". Preferred embodiments also provide an ending time or duration for the invalid status, or the invalid status may be allowed to persist until further notice. Context data marked "invalid" will generally be ignored by applications; however, applications can still access the context information and certain applications, such as context logging applications, may still use the information. This validity information is preferably available to all users of the context information, including mediators and monitors. The monitors may, for example, use context information marked "invalid" to decide when the information may again be valid.

Just as conflicts in context information can be used to set a context source to "invalid", harmony in context can be used to reset the source to "valid". For example multiple context sources may indicate that a person is in his office while his cell phone location indicates that he is at his home. This conflict can be used to mark the cell phone context information as "invalid". Should the cell phone location once again come into harmony with the other context sources, this could indicate that the person now has the cell phone in his possession and that the cell phone location can now be marked as "valid".

There are many potential sources of context information. By way of illustration but not of limitation, the discussion below will use three context sources; however, embodiments of the present invention may handle a variety of other forms of context information. The three forms used herein for illustration are: (1) calendar-based context; (2) cell phone-based location information; and (3) smart badge location information.

A context receiver for calendar-based context can indicate various types of status information about a calendar owner. For example, a user's calendar typically specifies when he is in the office, out of the office, busy (e.g., in a meeting), on vacation, and when it is outside this user's working hours. In some cases, calendar-based context can also indicate a user's location (i.e., as specified on his calendar entries).

A context receiver for cell-phone-based location information can provide location, and may also provide information about the user's speed and direction of travel. This information might be used to detect conflicts such as impossible or improbable physical locations for a user. For example, suppose that Mary is scheduled to participate in a meeting in conference room A123 in 5 minutes, according to her electronic calendar. Further suppose that Mary's cell phone indicates that she is 30 miles away and is moving at 60 miles per hour. Mary's calendar and her cell phone thus provide conflicting context data, and the monitor may conclude (based on the rules) from its input sources that Mary is either going to be late for the meeting, or is not going to attend the meeting. The monitor may make use of various types of systems or services as it evaluates rules (as shown in FIG. 3). One example is a travel time calculator. Travel time calculator services are known in the art. This service might be provided with 2 locations, such as the conference room and Mary's current location; or, it might be given additional information such as speed and direction of travel. An expected travel time can then be calculated. Mary might have a rule that says "If I am going to be at least 10 minutes late for a scheduled meeting, then page me".

A context receiver for smart badge location information can track a person's location within a set of buildings. This context receiver can provide events/notifications when a person enters or leaves one of the buildings and also when the person moves from one room to another in a building.

The input the monitor receives for calendar-based context, cell phone-based location context, and smart badge-based location context may be obtained, as needed, by one or more of the following techniques: by query when needed, by periodic polling, or by events.

In addition to these inputs from the context receivers 220 (typically received via the context server API 150 or via a mediator 230, as shown in FIG. 3), the monitor 340 preferably has access to other inputs and data. These include, but are not limited to: the current time and date; owner actions; rules; utility services 360; context change and owner interaction history; and timer expiration events.

The current time and date may be useful for looking at a user's calendar data. The rules applied when the monitor is analyzing/resolving conflicts may also be time-sensitive, and the current time and date may be used for analyzing these rules.

The monitor may also store or access a history (say for the last 24 hours) of all changes to all the context sources it monitors, as well as queries to users and their replies. This information can be used, for example, in the case where a set of users report that the same location service is giving bad information. This data could be used to determine that the location service is having problems, rather than the set of users, and a notification may be sent to the provider of the location service (represented in FIG. 3 by context supplier 350).

In preferred embodiments, when a user's context information changes, the monitor 340 checks for conflicts in that user's context. The monitor has inputs from a number of sources (as discussed above with reference to FIG. 3); preferably, the user is able to specify which context sources are used. Given an input, the monitor processes rules that specify actions, all of which are discussed in more detail below. For example, if the user's calendar indicates that he has a different scheduled event than he had five minutes ago, or a badge reader has recorded him entering the office building, then these context changes trigger an automated evaluation of other context information for this user. Based on the context change and whether there is a conflict, the monitor applies a set of rules and takes actions. These actions can be used to perform many different types of updates, such as updating the user's calendar information and/or to invalidate data from other context sources for a period of time. Or, the action might be to notify the context supplier of the conflict. As an example of updating the user's calendar, if the conflict arose because of incorrect information on the calendar, then the conflict might be resolved by deleting or changing an event. As an example of invalidating data from a context source, suppose the user's cell phone indicates that he is in the cafeteria of Building 123, but a badge reader in Building 678 (located several miles away from Building 123) has just detected this user's badge. The user may have forgotten his cell phone when he finished lunch, in which case an appropriate action is to ignore the cell phone location (i.e., the cell phone as a context source) for some period of time. As an example of notifying the context supplier of the conflict, suppose that a user's cell phone and smart badge are with the user but that the context reports one of them elsewhere. In this case, the service provider of the context information can be informed that it has a problem with its system.

FIG. 3 shows the monitor 340 interacting with users 330. User actions include, by way of example, instructions from the user to ignore a context source for some time period, or instructions from the user to update the context source (e.g., to delete a conflicting event from his calendar). Instructions from the user may be obtained in many different ways, and an implementation of the present invention may support one or more such methods. For example, an embodiment of the present invention might send a message as a page to a 2-way pager, and the user's response might be numeric data that is used to select from among multiple predefined actions (such as "press 1 to delete the conflicting calendar event", "press 2 to invalidate the cell phone as a context source", and so forth). In this example, instructions (derived from the rules) would be entered simply by pressing the proper key. The monitor is then responsible for correlating the response with the proper outstanding query, so that it can properly interpret the response. Alternative ways of providing user instructions include a voice-activated command processor or voice response unit; a graphical user interface ("GUI") that displays a pop-up asking the user to select (or otherwise provide) an appropriate response; a touch-sensitive screen with which the user can select a response; and so forth.

Timer expiration events (along with information about the event that caused the timer to be started) may be useful in many different scenarios, such as when an event is ambiguous. For example, suppose Fred is detected leaving the building at 11:15 a.m. but there is no corresponding event on his calendar. Fred might be leaving the building for a smoking break. If Fred normally takes 15 minutes for such breaks, he might define a rule that sets a "smoking break" timer for 15 minutes. If Fred reenters the building before the timer expires, the timer is simply canceled. However, if Fred does not reenter the building before the timer expires, then maybe Fred is not taking a smoking break after all. A rule might specify that if it is between 11:00 a.m. and 1:00 p.m., a message should be sent to Fred's cell phone, asking him whether he would like the monitor to schedule a lunch break on his calendar. (The duration of this lunch break might be determined by the rule, or by another rule, or could be determined by asking Fred to use the keys on his phone to signal the expected ending time or the expected duration of his lunch break.) Or, a rule might specify that a lunch break is to be automatically added to Fred's calendar, without requiring his input.

The rules are used to apply the judgment or decisions in the monitor. The rules used by a particular implementation may vary widely, depending on what context data is available, what the supporting organization (such as a corporation) wants, and what the individual user wants. The rules can change as the supporting organization and/or the user adds, deletes, or modifies them. The rules therefore allow organizations/users to personalize their own conflict detection and resolution techniques.

Preferably, all rules have a default action. In the simplest case, the default action is to do nothing.

If a rule includes the starting of a timer, the rule preferably also includes the specification of an action to take if a user response or other event doesn't cancel the timer before it expires. For example, with reference to the previously-described scenario of Fred leaving the building and starting a 15-minute timer, the action upon timer expiration might be "update the calendar by adding a lunch event".

Conceptually, the rules are modeled after the instructions that a person might give to an administrative assistant or those which the assistant might learn through observation. Several rules will now be provided by way of illustration. (Note that this set of rules contains some overlapping conditions with different corresponding actions. These rules are intended to show different possibilities, rather than a set of rules that might be applied for a particular individual.)

If the current time is after 4:00 p.m., and there are no off-site events on my calendar, and my smart badge indicates that I have left the building, then update my calendar to indicate that I have left for the day.

If the current time is between 1:00 p.m. and 4:00 p.m., and there are no off-site events on my calendar, and my smart badge indicates that I have left the building, then set a 10-minute "end of working hours" timer.

If my 10-minute "end of working hours" timer expires before I reenter the building, then update my calendar to indicate that I have left for the day.

If the current time is between 11:00 a.m. and 1:00 p.m., and there are no off-site events on my calendar, and my smart badge indicates that I have left the building, then add a 1-hour lunch event to my calendar.

If my smart badge indicates that I have entered the building, and my cell phone is located outside the building, then set the validity attribute for my cell phone location context to "ignore until 5:00 p.m." and notify me that my cell phone is being ignored since the phone is not with me. (This rule might be used to account for cases in which the user forgot to bring his cell phone to his office.)

If I have a meeting scheduled for the current time, but my smart badge indicates that I am not in the meeting room, then send a message to my pager to remind me of the meeting and provide the following response options:

1) I plan to attend (the system will take no other action)

2) Inform the other participants that I will be late (this will invoke another service to send the notice)

3) Delete the event from my calendar and inform the other participants that I will not attend.

If my smart badge indicates that I have returned to my office prior to the ending time of a meeting scheduled on my calendar, then change my calendar to indicate that I am available by updating my calendar, setting the actual end of meeting time to the current time.

If my smart badge indicates that I have arrived in my building, and my calendar indicates that my scheduled working hours have not yet started, then update my calendar to change my working hours to start at the current time.

If it is 30 minutes past my scheduled end of working hours, and my smart badge indicates that I am still in the building, then send me a message asking me how long I plan to stay.

If my smart badge locates me in my office, but my cell phone location changes from my office to the parking lot, then disable my smart badge as a context source until the start of my next scheduled working hours and notify me that my badge is being ignored since the badge is not with me. (This rule might be used to account for cases where the person forgets to take his badge when he leaves his office for the day.)

As demonstrated by these sample rules, the actions to be performed as a result of the rules can vary widely. In general, possible actions include (with each action being specific to a particular user, in preferred embodiments):

add, delete, or change calendar events;

update an updateable context source;

add, delete, or change working hours intervals;

inform the owner of the calendar or other context information of a detected discrepancy or event, and ask what action to take (optionally setting a timer to control how long to wait for the owner's response);

in a context receiver, set the context information's validity attribute to "invalid" or "valid" for a time period;

notify the supplier of context information that there is an error in the data being provided;

initiate a task; and set or cancel a timer.

As an example of setting the validity attribute for a context source to "invalid", if a conflict is detected between Allen's smart badge and his cell phone (perhaps because Allen left his location-sensing cell phone at home), Allen might indicate that the context receiver for location data from his cell phone should set the validity attribute for this cell phone to invalid until 6:00 p.m. (when Allen expects to be back home). Given this same conflict between cell phone and smart badge, another user Lynn might specify a rule that resolves the conflict in a completely different way. For example, Lynn might realize that she frequently loses her smart badge, but that she always has her cell phone, and thus in her case, her rules specify that her cell phone should "win" the conflict with her smart badge.

When querying the user for whom a conflict was detected, many different techniques might be used, such as displaying a pop-up window on the user's workstation, sending the user a 2-way page, or initiating a telephone call to the user. Preferably, regardless of the query technique, the query provides a brief description of the conflict and gives the user predefined options from which to select. For example, a message might say, "Your smart badge locates you in your office, but your calendar has a meeting scheduled at this time in Room 310. Press 1 to ignore your smart badge until further notice, press 2 to remove the meeting from your calendar, or press 3 if you want no action taken."

Figure 4:
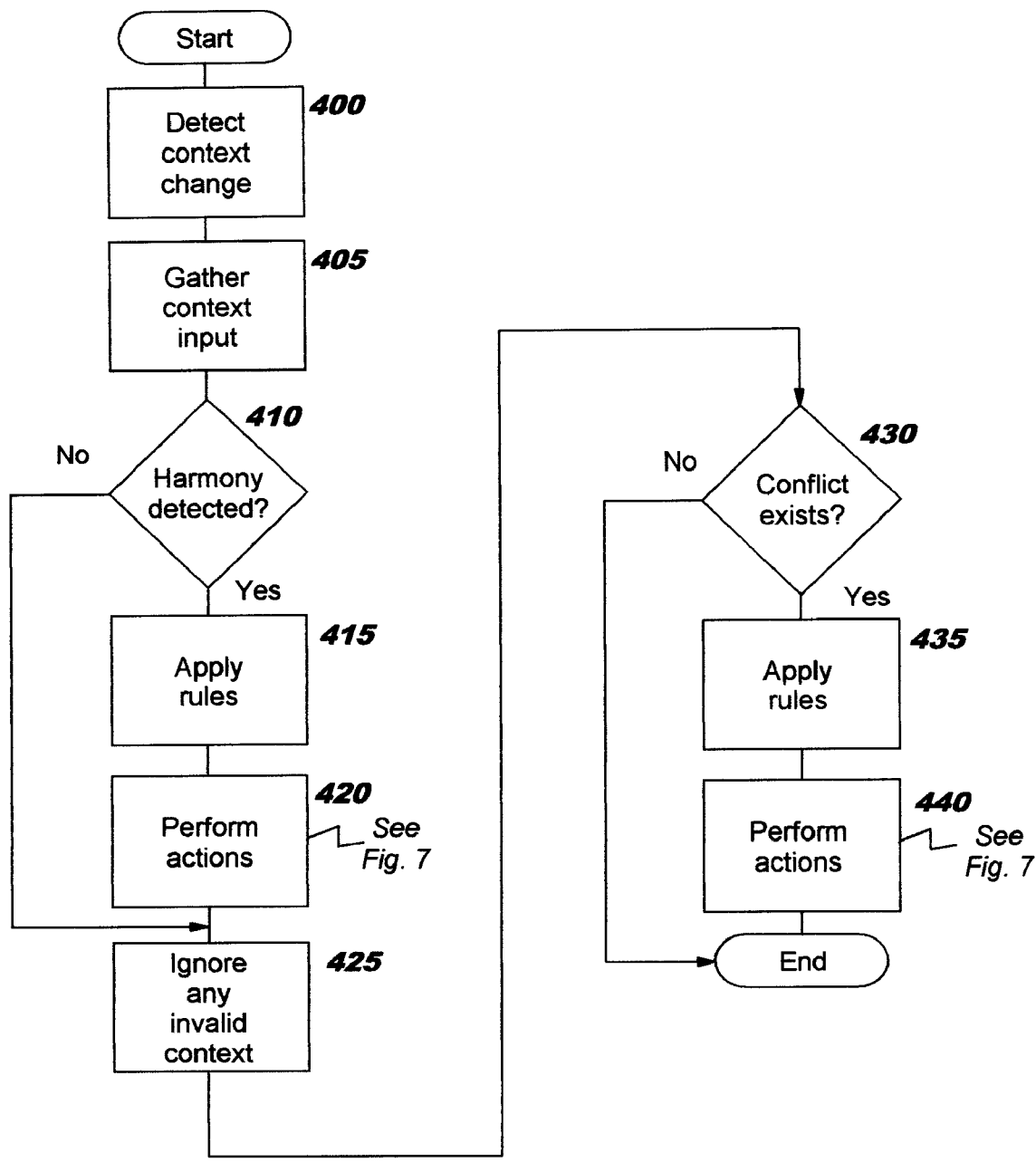
FIGS. 4-7 provide flowcharts illustrating logic that may be used when implementing preferred embodiments of the present invention.

Referring now to FIGS. 4-7, flowcharts are provided that depict logic that may be used to implement preferred embodiments. As shown in FIG. 4, the general mode of operating the present invention comprises detecting a context change (Block 400), such as receiving input that the user is now in a new location or that a different event is now scheduled on the user's calendar, and Block 405 then gathers available context input from context receivers.

Block 410 checks to see if the context sources are in harmony. If so, then Block 415 applies rules that are applicable to this user. In applying these rules, Block 415 may make use of utility services (as illustrated at 360 in FIG. 3) such as a travel time calculator and/or a location service. Block 420 performs the unit(s) of work to carry out action(s) specified by the matching rule(s). (This process is described in detail with reference to FIG. 7, below.) These actions may include updating an updateable context source (such as an electronic calendar), validating or invalidating one or more context sources (either temporarily or until further notice), or notifying a context supplier. In preferred embodiments, all rules applicable to this user are evaluated, and the actions from each matching rule are performed. In alternative embodiments, the process of applying rules may be halted when a first matching rule is encountered, and the actions for that rule are then carried out.

Block 425 is reached following completion of Block 420, or when the harmony was not detected in Block 410. Block 425 ignores context information from sources whose validity attribute is set to "invalid" for the current time.

Block 430 then determines whether a context conflict exists. To avoid creating false conflicts, certain context information (such as location information) should not be interpreted too precisely. For example, having the smart badge and cell phone location information within 20 feet of one another should not be interpreted as a conflict. This distance is preferably configurable and may vary for different physical locations as well as with different context sources.

If no conflict exists, then the process of FIG. 4 exits. Otherwise, Block 435 applies rules that are applicable to this user and Block 440 performs the unit(s) of work to carry out action(s) from the matching rule(s), as described above with reference to Blocks 415 and 420. The processing of FIG. 4 then ends for this invocation.

Figure 5:
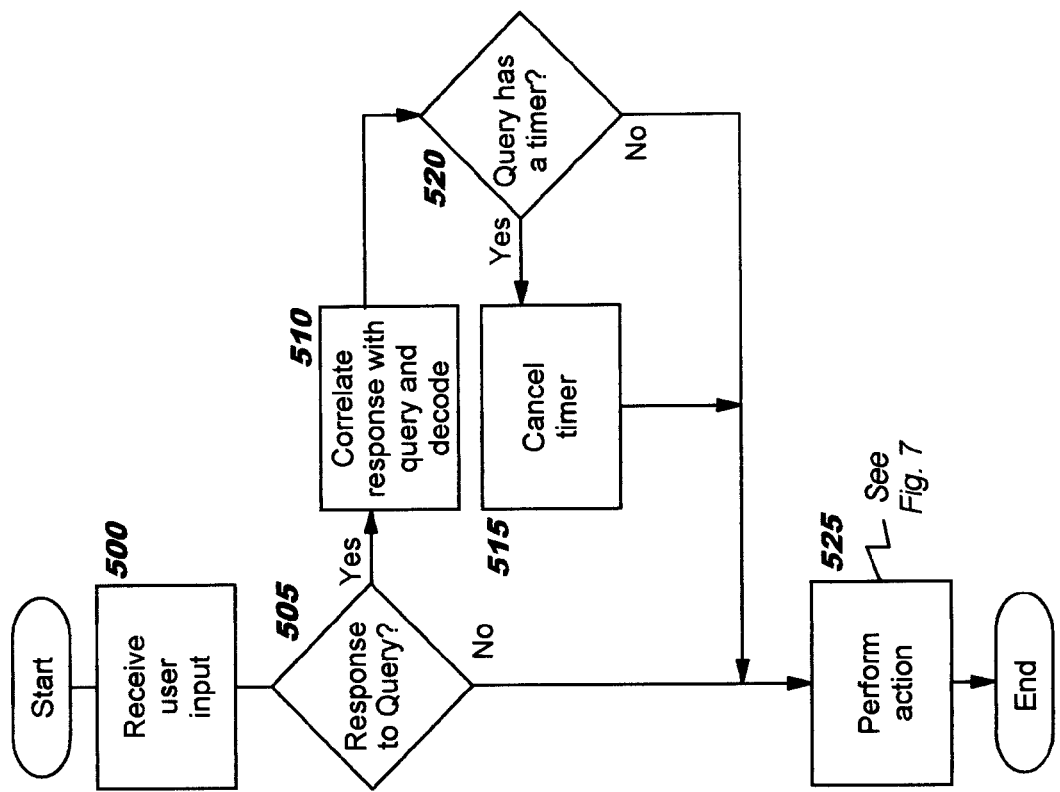

FIG. 5 shows logic that may be used to process explicit user input. This is generally a response to a query from the monitor, but may also be an asynchronous request from the user. The user's input is received (Block 500), and Block 505 then checks to see if this response corresponds to a query from the monitor. If so, then Block 510 correlates the response with the outstanding query and decodes it. That is, the response is interpreted based on any correlated query that may be outstanding. So, for example, if the user was instructed to press 1 on a keypad to signify that he has now left work for the day, and the input is a signal that the 1 was pressed, then the interpretation is that the user has left for the day, and the appropriate action (as specified by the matching rule) is to create an "update my working hours" unit of work for execution below (see Block 525).

After correlating the response with a query, Block 520 checks to see if the query to which this response corresponds has an associated timer. If so, then Block 515 cancels this timer. In either case, processing continues at Block 525, which performs the unit(s) of work (as described in FIG. 7) to carry out the action(s) called for in the rule(s) associated with this user response. Processing for this iteration of FIG. 5 then ends.

Figure 6:
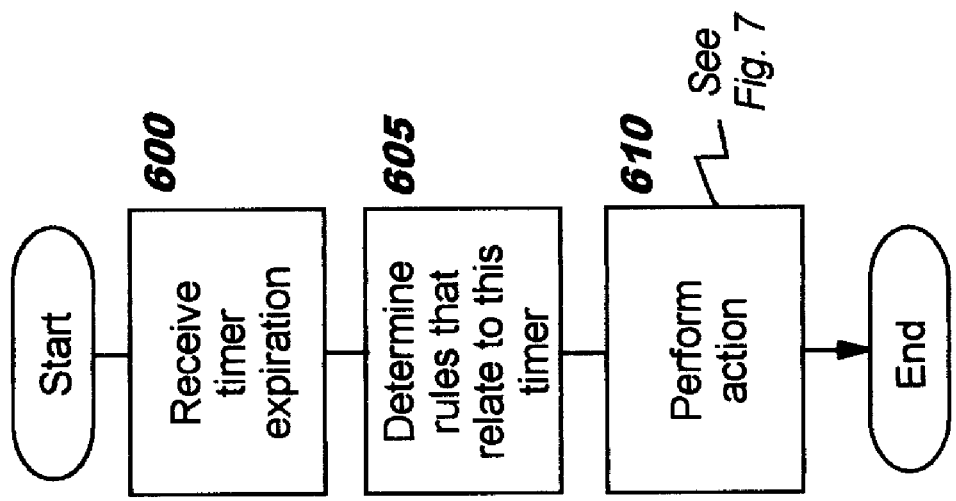

FIG. 6 provides logic that may be used to handle expiration of a timer. The expiration event preferably provides information about the event that caused the timer to be started. This expiration information is received at Block 600. Block 605 then determines the rules that relate to the timer, and Block 610 performs the actions specified by these rules (as described in FIG. 7). The processing of FIG. 6 then ends for this iteration.

Figure 7:
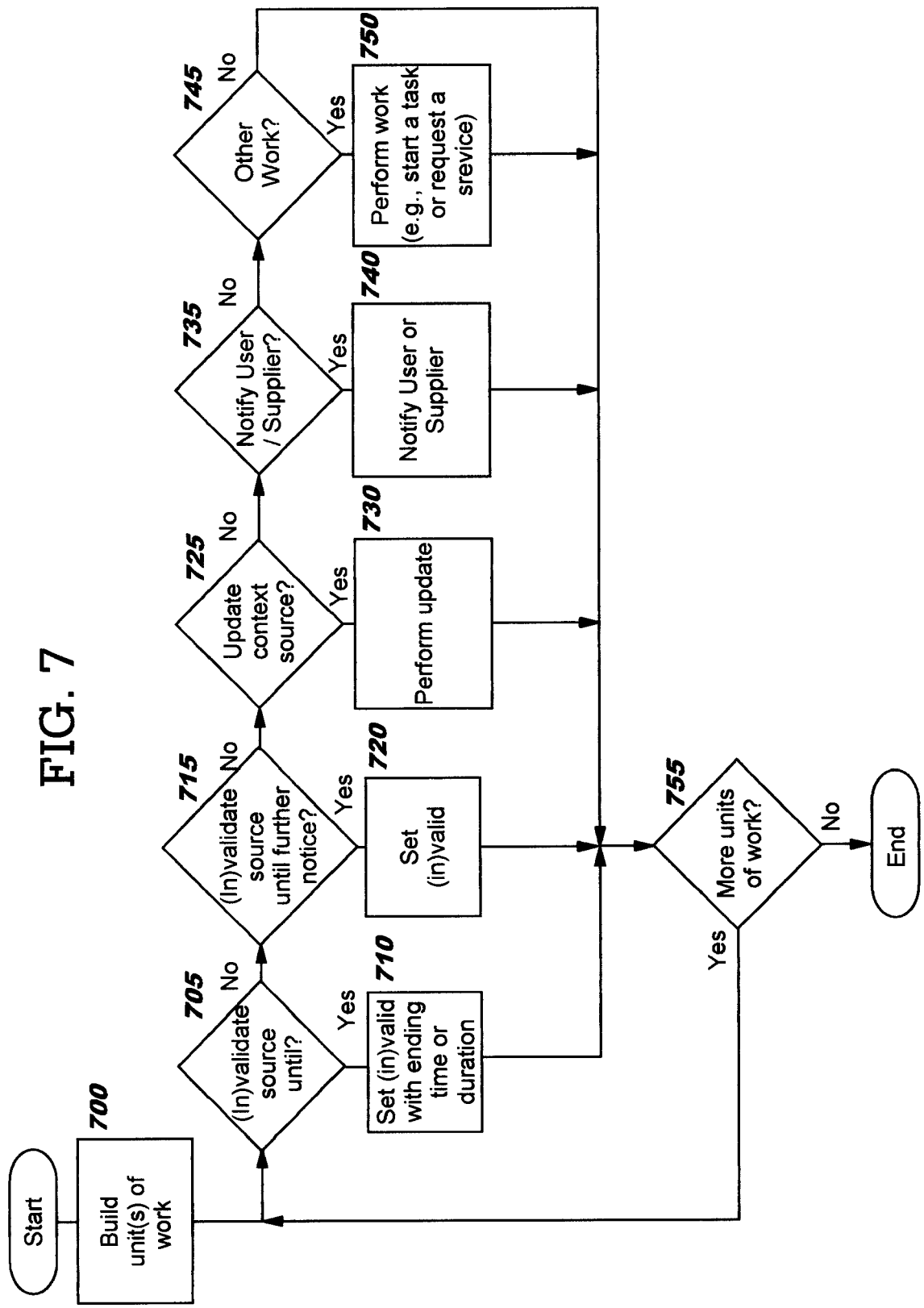

FIG. 7 depicts logic used in preferred embodiments to perform the actions referred to in FIGS. 4-6. Block 700 builds one or more units of work, as appropriate. The logic of Blocks 705-750 then performs each of these work units, and is preferably implemented as a switch operation that checks for and processes each type of work unit. Block 705 checks to see if the unit or work is of the form "invalidate (or validate) context source XYZ until date/time". If so, then Block 710 sets the validity attribute of the indicated context source to "invalid" or "valid", as appropriate, until an ending time (or for a duration of time) specified by the action.

If Block 705 has a negative result, then Block 715 tests to see if the action was to invalidate (or validate) a context source until further notice. If so, Block 720 sets the validity attribute for that source to "invalid" or "valid", as appropriate.

If neither Block 705 or Block 715 is true, control reaches Block 725, which tests to see if the unit of work calls for updating a context source (e.g., to update the specified working hours and/or scheduled events on this user's calendar). If this test has a positive response, then the corresponding update of the context source (as indicated by the matching rule) is performed (Block 730).

If the unit of work still does not match any of the tests, control reaches Block 735, which checks to see if the unit of work calls for sending a notification to the user or to the context supplier. If so, then the notification is sent at Block 740.

Finally, Block 745 checks to see if the unit of work calls for performing some other type of work. If so, then that work is performed at Block 750. For example, a task might be started, a service might be requested, as indicated in FIG. 7.

Following completion of Blocks 710, 720, 730, 740, or 750, control transfers to Block 755. In addition, if the unit of work does not match any of the tests, then the input is preferably ignored, and control transfers to Block 755.

Block 755 tests whether there are any more units of work to be processed. If so, then control returns to Block 705; otherwise, the processing of FIG. 7 exits for this invocation.

Rule-based systems and context services are known in the art. Using rules to detect and resolve conflicts in information from multiple context receivers, as disclosed herein, is not known. Many systems are known in the art that provide and use location information. IBM's Tempus Fugit project, for example, uses both calendar information and location information for time-based purposes, such as predicting when a person may arrive at a meeting. (See http://time.almaden.ibm.com for more information on Tempus Fugit.) No systems are known to the inventors that use context information to update an updateable context source (such as by adjusting scheduled calendar events and/or working hours upon detecting context conflicts), or to invalidate a context source based upon a detected conflict, or to notify a context supplier that it is providing erroneous data.

As has been demonstrated, the present invention discloses advantageous techniques for detecting conflicts in context information from various sources, and that information may be used to automatically update one or more context sources and/or to invalidate (for a period of time or until further notice) input from one or more context sources. Or, the update may be made after querying the user for input. Rules are preferably used to specify how conflicts for each user (and/or for a particular organization or other user category) are to be resolved. Updating the context source is particularly useful for electronic calendars, and invalidating the source data is particularly useful for lost, forgotten, misplaced, or loaned devices. When using the present invention, more accurate data will be reflected on users' calendars with less effort required of those users, enabling other individuals to more accurately determine where the calendar owner is and his availability at a point in time. Additionally, calendar-based tools (such as those disclosed in the related U.S. patents for responding to incoming events such as voice mail and for using calendar events to update status in other applications), vacation planners, and so forth will have more accurate calendar data with which to work. Location-based applications and other context-aware applications will have more accurate context information from sources that are updateable and will have better knowledge of when context data is valid. Suppliers of context information will be notified when their service is providing erroneous context information, allowing them to correct these errors.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flowchart illustrations and/or flow diagrams of methods, apparatus (systems), and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

While preferred embodiments of the present invention have been described, additional variations and modifications in those embodiments may occur to those skilled in the art once they learn of the basic inventive concepts. Therefore, it is intended that the appended claims shall be construed to include all such variations and modifications as fall within the spirit and scope of the invention.

What is claimed:

1. A system for resolving conflicts in context information, comprising:
   a computer comprising a processor; and
   computer program instructions which execute, using the processor, to implement functions comprising:
   gathering context information for a user from a plurality of context sources;
   determining whether a conflict exists in the gathered context information; and
   if a conflict is determined to exist, resolving the determined conflict, further comprising:
   evaluating a set of user-customizable conflict-resolution rules to select at least one rule that is usable for resolving the determined conflict; and
   performing each of at least one conflict-resolution actions specified by each of the selected rules, wherein at least one of the conflict-resolution actions updates one of the context sources.

2. The system according to claim 1, wherein the gathering is triggered by detecting a context change pertaining to the user.

3. The system according to claim 1, wherein the functions further comprise ignoring, by the gathering, any context information from any of the context sources which are marked as invalid.

4. The system according to claim 1, wherein the functions further comprise ignoring, by the determining, any context information from any of the context sources marked as invalid.

5. The system according to claim 1, wherein the updated context source is the user's electronic calendar.

6. The system according to claim 5, wherein the update comprises at least one of adding, deleting, or changing at least one event on the user's electronic calendar.

7. The system according to claim 5, wherein the update comprises at least one of adding, deleting, or changing working hours on the user's electronic calendar.

8. A computer program product for resolving conflicts in context information, the computer program product embodied on one or more computer-readable storage media and comprising computer-readable program code for:
   gathering context information for a user from a plurality of context sources;
   determining whether a conflict exists in the gathered context information; and
   if a conflict is determined to exist, resolving the determined conflict, further comprising:
   evaluating a set of user-customizable conflict-resolution rules to select at least one rule that is usable for resolving the determined conflict; and
   performing each of at least one conflict-resolution actions specified by each of the selected rules, wherein at least one of the conflict-resolution actions updates one of the context sources.

9. The computer program product according to claim 8, wherein at least one of the conflict-resolution actions comprises marking one of the context sources as invalid.

10. The computer program product according to claim 9, wherein the marking of the context source as invalid is effective until an ending time.

11. The computer program product according to claim 9, wherein the marking of the context source as invalid is effective for a duration of time.

12. The computer program product according to claim 9, wherein the marking of the context source as invalid is effective until further notice.

13. The computer program product according to claim 8, further comprising computer-readable program code for marking a particular one of the context sources as valid, wherein the particular one was previously marked as invalid, upon detecting harmony among the context sources.

14. The computer program product according to claim 8, wherein at least one of the conflict-resolution actions comprises notifying a context supplier of the determined conflict.

15. The computer program product according to claim 8, wherein the computer-readable program code for determining further comprises computer-readable program code for using location data gathered from two or more of the context sources to determine whether the conflict exists.

16. The computer program product according to claim 8, wherein at least one of the conflict-resolution actions comprises requesting the user to select from among a plurality of conflict-resolution actions specified by one of the selected rules.

* * * * *